Jan. 3, 1950     L. T. SACHTLEBEN     2,493,089
MONITORING SYSTEM FOR SOUND RECORDING
Filed Oct. 31, 1947     2 Sheets-Sheet 2
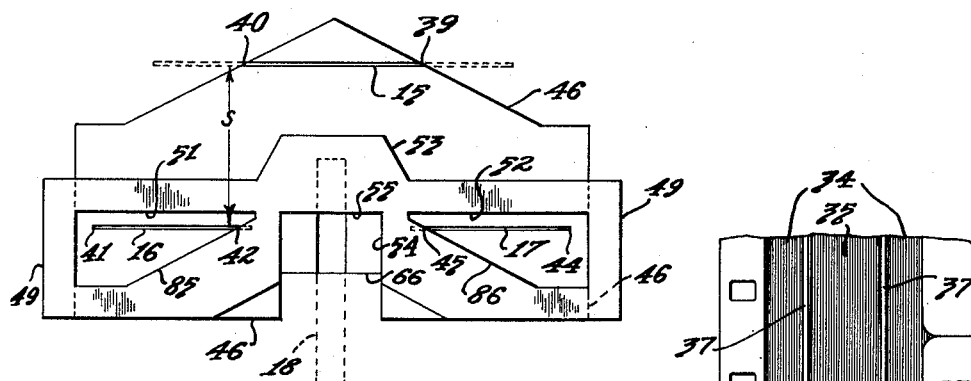
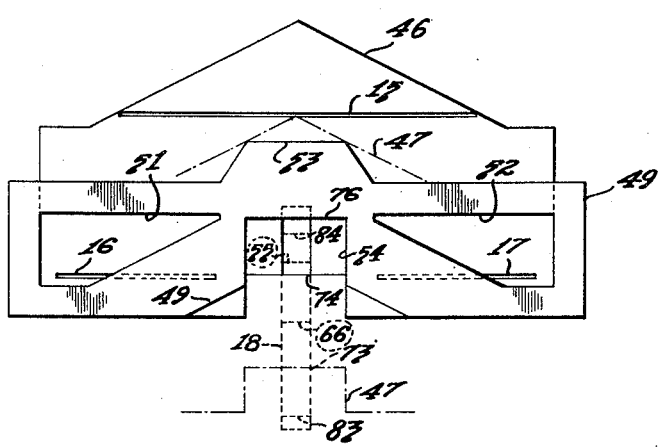
INVENTOR.
Lawrence T. Sachtleben
BY
ATTORNEY.

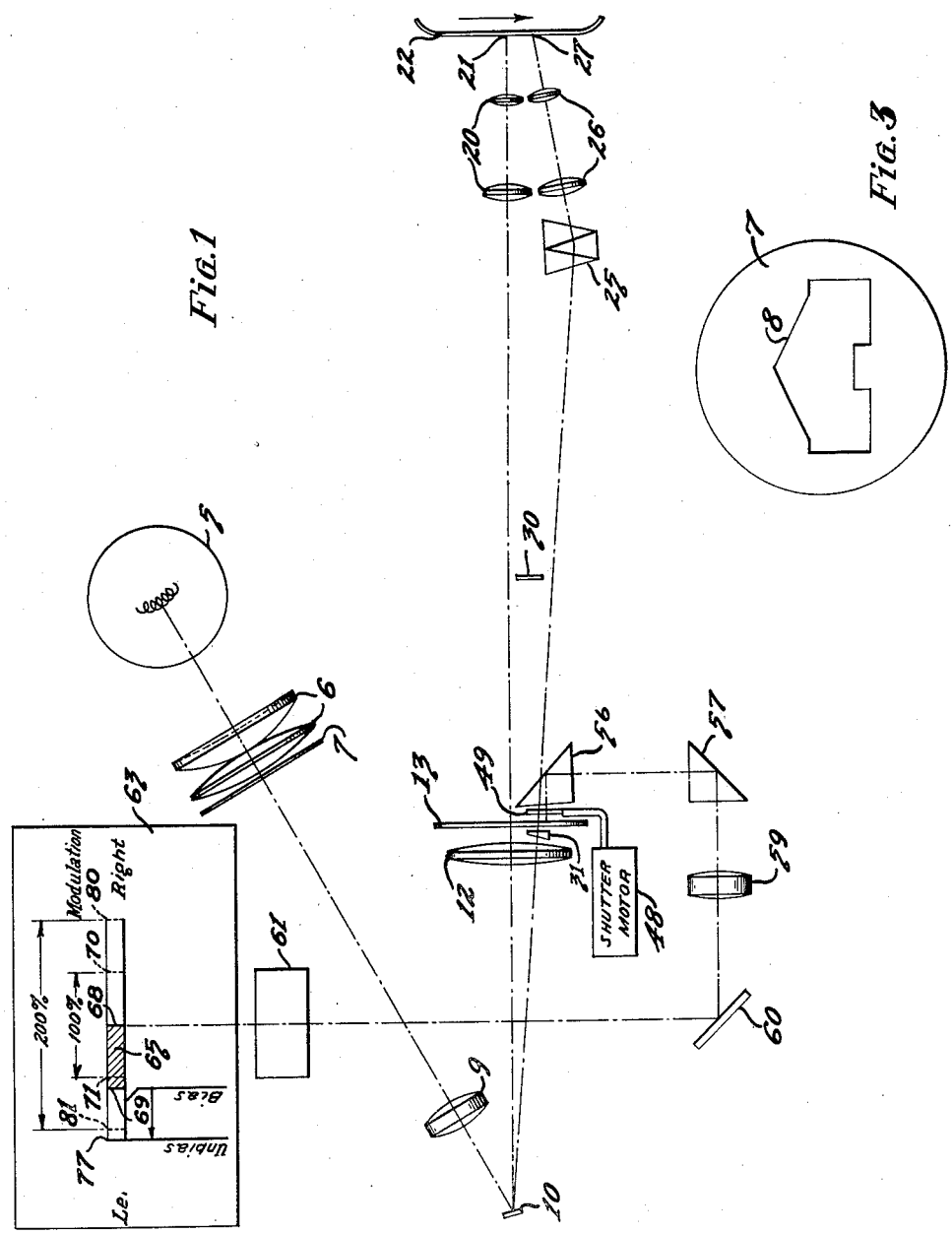

Patented Jan. 3, 1950

2,493,089

UNITED STATES PATENT OFFICE 2,493,089

MONITORING SYSTEM FOR SOUND RECORDING

Lawrence T. Sachtleben, Haddonfield, N. J., assignor to Radio Corporation of America, a corporation of Delaware Application October 31, 1947, Serial No. 783,313

12 Claims. (Cl. 179—100.3)

This invention relates to sound recording systems, and particularly to the portion of such systems used for monitoring the action of the modulation of a light beam by the signal currents and the modulation of a light beam by the average value of the signal currents used for noise reduction.

Monitoring systems used for adjusting the modulating light beam and for observing its action during the recording operation have been suggested, as shown in Dimmick United States copending application, Ser. No. 629,295, filed November 17, 1945, now Patent No. 2,468,048, granted April 26, 1949, and in my United States copending application, Ser. No. 743,620, filed April 24, 1947. The present monitoring system disclosed hereinafter, is one adapted to monitor the adjustment of a recording light beam with respect to a slit through which the light beam is passed, and the adjustment and action of a noise reduction shutter positioned behind the slit.

The particular recording system for which the monitoring system was designed is of the type disclosed in an article by Messrs. G. L. Dimmick and A. C. Blaney, published in the November, 1939 edition of the "Journal of the Society of Motion Picture Engineers," and is commonly known as a direct positive sound recording system. The principal feature of such a system is that the light is impressed on the sound track area in such a manner, that, upon the normal development of the film, a positive or release type of sound record is obtained.

Another feature of this type of recording system is anticipatory noise reduction; that is, noise reduction which is initiated at a point in advance of the point of recording, thus permitting the noise reduction action to accommodate the modulations and prevent peak clipping. To obtain this latter action, a pair of beams are simultaneously projected to the film at different points longitudinally of the film, one beam being vibrated in accordance with the instantaneous values of the signal, and the other beam being vibrated in accordance with the average value of the signal. As mentioned above, the present monitoring system not only aids in the adjustment of the recording elements, but also indicates their action during the actual recording of the sound record.

The principal object of the invention, therefore, is to facilitate the monitoring of a direct positive sound recording system.

Another object of the invention is to provide an improved monitoring system for a direct positive sound recording system having anticipatory noise reduction.

A further object of the invention is to provide an optical system which will indicate the adjustment and action of a pair of recording beams at a common observation point.

A still further object of the invention is to provide a sound recording monitoring system for a light beam modulated in accordance with the instantaneous values of a signal, and a light beam modulated by the average value of said signal.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Fig. 1 is a diagrammatic view of a monitoring system of the invention applied to a direct positive recording system.

Fig. 2 is a sound record obtainable with the sound recording system shown in Fig. 1.

Fig. 3 is an elevational view of the aperture plate used in the sound recording system of Fig. 1.

Fig. 4 is an elevational view of the recording slit and monitoring mask embodying the invention at zero modulation or no-signal condition, and Fig. 5 is a second view of the slit and monitoring mask at one hundred percent modulation condition.

Referring now to the drawings, in which the same numerals identify like elements, light from a recording lamp 5 is collected by condenser lenses 6 and projected through an aperture mask 7 having an aperture 8 therein (see Fig. 3) to a lens 9 through which the light is impressed upon the mirror 10 of a standard type of galvanometer or other similar modulating element. The light from mirror 10 is projected through a lens 12 to a slit mask 13 where it passes through slits 15, 16, and 17 and an aperture or slot 18 (see Figs. 4 and 5). The light passing through slit 15 is projected through objective lenses 20 to point 21 on the film 22, while the light through slits 16 and 17 is projected through an achromatic prism 25 and objective lenses 26 to point 27 on the film 22. A mask 30 has been provided to prevent the prism 25 from seeing the slit 15 and the lenses 20, prisms 31 being provided between the lens 12 and slit plate 13 to direct the light to the prism 25.

Referring to Fig. 2, the point 21 is shown at the beginning of the modulations 33, while the point 27 is shown at the beginning of the noise reduction action. That is, the opaque areas 34 are produced by light passing the apertures 16 and 17, while the opaque area 35 and the opaque portion of the modulations 33 are produced by the light passing aperture 15. The transparent bias lines 37 are produced by the noise reduction system which masks narrow portions of the film during the time of no-signal, while the other transparent portions are obtained by the masking action of the noise reduction system together with that due to the vibration of the light beam passing the aperture 8.

Although the action of this type of recording system is well-known, it may be briefly described by reference to Figs. 4 and 5, wherein, in Fig. 4, the no-signal condition is illustrated. This stand-by position permits light to pass through approximately the central fifty percent of the slit 15 from the point 39 to the point 40, and light to pass through the slit 16 from its end 41 to the point 42 and through slit 17 from its end 44 to the point 45. The pair of points 40 and 42 and pair of points 39 and 45 are spaced laterally to mask or to prevent light from reaching the film along two narrow areas, as shown at 37 in Fig. 2. Since the signals of light from the slit 15 and the light signals through the slits 16 and 17 are each projected through the independent optical trains 20, and 25—26, respectively, they will be projected at different longitudinal points on the film, as shown, respectively, at 21 and 27. Now, when the light beam is modulated by a signal, more and less of the slit 15 will be illuminated with the light beam shown by the full lines 46 to produce the modulations 33, one extreme position of the beam at one hundred percent modulation being shown in Fig. 5 by the full lines 46 and the other extreme position by the broken lines 47. It will be noted that when modulation is one hundred percent as shown in Fig. 5, light is permitted to pass through only the end portions of the slits 16 and 17 to form the narrow portions of the opaque strips 34. As the amplitude of the signal decreases, a larger proportion of the slits 16 and 17 will pass light to the film until, at no-signal, the condition will again be as shown in Fig. 4 and described above.

Referring now to Fig. 1, a shutter motor 48 actuates a shutter vane 49, these elements being similar to the shutter shown in Pettus copending application, Ser. No. 739,484, filed April 4, 1947, now U. S. Patent No. 2,452,322. The shutter motor is energized with the average value of the signal currents after passing through a rectifier-amplifier unit. The shape of the shutter vane 49 is shown in Figs. 4 and 5, as a rectangular unit with two trapezoid-like openings 51 and 52, a tab section 53, and a notch 54. This shutter moves very close to the slit plate 13. Thus, the amount of light passing through the aperture 18 will be determined by the position of notch edge 55 of the shutter 49, and the position of the light beam edge 66. This emergent light will be reflected by a right angle prism 56 downwardly to another right angle prism 57, the prism 57 projecting the light horizontally and backwardly in the direction of the galvanometer mirror 10 through a simple corrected achromatic lens 59 to a reflecting mirror 60. Mirror 60 projects the light upwardly to a second reflecting mirror 61 where it is projected to a monitoring card 63 on which the light beam is shown, where it serves as an indicator, so the mirror 10 and shutter 49 may be adjusted.

Referring again to Figs. 4 and 5, and to the monitoring card shown at 63 in Fig. 1, the light beam shown by the cross-hatched area 65 has its right-hand end 68 produced as the image of edge 66 of the light beam 46, while its left-hand end 69 is produced as the image of the edge 55 of the notch 54 in the shutter 49. (See Fig. 4.) Thus, the shaded area 65 will appear as shown at no-signal or zero modulation. Now, for one hundred percent modulation, the right-hand end 68 of the light beam 65 will vibrate between points 70 and 71 on the card which corresponds to points 73 and 74 on the aperture 18 in Fig. 5. As the signal currents increase in amplitude to produce one hundred percent modulation, the shutter 49 moves upwardly so the edge of notch 54 is now at 76 corresponding to point 77 in Fig. 1. The right-hand end of the beam 65, therefore, provides an indication of the adjustment of the mirror 10 or aperture 8 and the extent or level of the vibration of the beam 46 and the left-hand end indicates the adjustment of the shutter 49 and the extent or amplitude of movement of the shutter. For two hundred percent modulation, the right-hand end of beam 65 will vibrate between points 80 and 81 in Fig. 1 corresponding to points 83 and 84 in Fig. 5. The tab 53 prevents the upper end of aperture 18 from passing light in the stand-by position, as shown in Fig. 4.

There has been described above a direct positive recording system producing a duplex variable area sound track and employing auxiliary slits 16 and 17 controlled by a shutter 49 beyond the slits to expose the noise reduction envelopes, and also employing a vertical slot 18 located between the auxiliary slits to provide for monitoring both the amplitude of the modulating aperture image at the slit 15 and the movement of the shutter vane beyond the slit, and in which system the maximum required displacement of the shutter vane is equal to the amplitude of the light beam at one hundred percent modulation as determined by equality of the slopes of edges 46, 85, and 86. The following dimensions are limitations to be observed in the interest of the most economical utilization of available space consistent with the proper operation of the system when the distance between the modulation and noise reduction slits is S and the maximum modulation to be monitored is X times one hundred percent:

The distance between the modulating slit 15 and the adjacent end of monitoring slot 18 is to be not less than 100% amplitude of vibration of beam 46.

The distance between slit 15 and the adjacent edge of the tab 53 is not to be less than 100% amplitude when the system is in stand-by condition.

The distance between notch edge 55 and the parallel edge of the tab 53 is not to be less than 100% amplitude.

The distance between monitoring edge 66 of the light beam and slit 15 is not to be less than $(1+X) \times 100\%$ amplitude when the system is in stand-by condition.

The total length of the monitoring slot 18 is not to be less than $X \times 200\%$ amplitude.

The indentation of monitoring edge 66 of the light beam with respect to the lower edges 46 of the light beam is to be not more than $S-100\%$ amplitude.

The distance from slit 15 to the lower edges of the light beam is to be not less than $S + X \times 100\%$ amplitude when the system is in stand-by condition.

The distance from the monitoring edge 55 of the shutter vane to the intersection point of the cutting edges 85 and 86 of the apertures 51 and 52 is to be not more than 100% amplitude.

Sometimes, it may be desirable to invert the shutter apertures 51 and 52 and have the shutter raised to its nearest position to the slit 15 in its stand-by condition, from which position the shutter drops the above described amount to clear the track area to allow recording of full modulation of slit 15. However, the illustrated and above described arrangement is preferred.

A particular feature of the system is that from the time the monitoring light beam leaves the galvanometer and until reflected to the screen by the final mirror, it lies in the same vertical plane including the galvanometer mirror and travels at all times in a nearly horizontal or vertical direction. As it reaches the screen, it travels in a plane which is at right angles to this original plane, and this relationship insures that the final image is free from obliquity to the horizontal without the awkward skew mounting of mirrors sometimes required in monitoring systems. The arrangement also permits a very simple and economical construction for the monitoring beam reflecting optics.

I claim:

1. A monitoring system for a sound recording system comprising a source of light, an aperture plate having an aperture therein for forming light from said source into a single beam, means for vibrating said beam of light passing through said aperture in said plate, a slit mask over which said light beam is vibrated, said slit mask having a plurality of separated elongated slits and an elongated slot therein, said slits and said slot being in the same plane, a film, means for directing light from said elongated slits to said film, an observation means, and means for passing light through said elongated slot to said observation means, said slot being positioned intermediate certain of said elongated slits.

2. A monitoring system in accordance with claim 1, in which a shutter is provided between said slit mask and said means for directing light to said observation means for controlling the position of one end of the light beam projected to said observation means.

3. A monitoring system in accordance with claim 1, in which said slits have their longitudinal axes parallel to one another, and said slot has its longitudinal axis perpendicular to the axis of said slits.

4. A slit mask for recording and monitoring a light beam in a direct positive recording system comprising an opaque plate having an elongated modulating slit therein, a pair of noise reduction slits spaced from said modulating slit and having their longitudinal axes parallel with the axis of said modulating slit, and an elongated slot of greater width than said slits and positioned between said noise reduction slits with its axis perpendicular to the axis of said slits.

5. A modulating, noise reduction, and monitoring mask for a direct positive recording system comprising an opaque plate having a narrow, elongated, modulating slit therein, a pair of similar width slits with coincident axes spaced from said modulating slit and extending beyond the ends of said modulating slit, an elongated and monitoring slot positioned between the adjacent ends of said noise reduction slits and having its axis perpendicular to the axes of said slits.

6. A slit mask for recording and monitoring the light beam of a direct positive recording system comprising an opaque plate having a plurality of elongated slits and a slot therein over which said light beam is vibrated, one of said slits passing light to form the signal modulations of a sound record, another pair of said slits passing light to form the noise reduction portion of said sound record, said pair of slits being spaced from said first mentioned slit, all of said slits having their longitudinal axes parallel, and said slot passing light to form a monitoring image, said slot being positioned between said pair of slits and having its longitudinal axis perpendicular to the axes of said slits.

7. In a sound recording system for recording signals on a moving film, the combination of a light source, means to form a defined single beam of light, a slit plate over which said beam of light is vibrated in a direction effectively parallel to the movement of said film, said slit plate having a plurality of separated slits and a slot therein, said slot being positioned between a pair of said slits and perpendicular to and in line with the center of another of said slits, an observation medium, and optical elements for reflecting light through said slot in the plane of vibration of said beam and perpendicular thereto, one edge of said beam being observable on said medium, said slot, observation medium and optical elements constituting a monitoring system for providing a visible indication of the recording.

8. In a sound recording system for recording signals on a moving film, the combination of a light source, means to form a single notched beam of light, a slit plate over which said beam of light is vibrated in a directon effectively parallel to the movement of said film, said slit plate having a plurality of separated slits and a slot therein, said slot being positioned between a pair of said slits and perpendicular to and in line with the center of another of said slits, an observation medium, and optical elements for reflecting light through said slot in the plane of vibration of said beam and perpendicular thereto, one edge of said beam being observable on said medium, said slot, observation medium and optical elements constituting a monitoring system for providing a visible indication of the percentage modulation of the recording light beam.

9. The invention set forth in claim 8, in which a shutter is provided and light through said slits is projected to said film at spaced longitudinal positions thereon, light through said slot being modulated by said shutter to indicate the amount of noise reduction applied.

10. A monitoring system for a recording apparatus in which signals are recorded on a moving film, said system comprising a light source, an aperture plate for forming a single light beam from said source, a slit and slot plate, means for vibrating said beam effectively in the plane of advancement of said film, an observation medium, and optical means for deriving from said single vibrating beam a second light beam emerging from said slot and for projecting said second beam onto said observation medium.

11. A monitoring system in accordance with claim 10, in which a screen and optical means are provided for projecting said second beam to said observation medium in a plane substantially at right angles to said first plane of vibration.

12. A monitoring system in accordance with claim 10 wherein said second beam is maintained in said plane of vibration of said first named beam.

LAWRENCE T. SACHTLEBEN.

REFERENCES CITED

The following references are of record in the file of this patent:

UNITED STATES PATENTS

| Number | Name | Date |
|---|---|---|
| 2,166,185 | Stack | July 18, 1939 |
| 2,220,198 | Batsel | Nov. 5, 1940 |
| 2,289,893 | Wolfe | July 14, 1942 |
| 2,318,138 | Benfer | May 4, 1943 |